US011440706B2

(12) United States Patent
Wong et al.

(10) Patent No.: US 11,440,706 B2
(45) Date of Patent: Sep. 13, 2022

(54) LID COVER HAVING A LOCKING MECHANISM AND CONTAINER ASSEMBLY INCLUDING THE LID COVER

(71) Applicant: SIM DESIGN LIMITED, Hong Kong (HK)

(72) Inventors: Siu Wah Wong, Hong Kong (HK); Shun Sang Poon, Hong Kong (HK)

(73) Assignee: SIM DESIGN LIMITED, Hong Kong (HK)

( * ) Notice: Subject to any disclaimer, the term of this patent is extended or adjusted under 35 U.S.C. 154(b) by 0 days.

(21) Appl. No.: 17/233,917

(22) Filed: Apr. 19, 2021

(65) Prior Publication Data

US 2021/0331842 A1 Oct. 28, 2021

(30) Foreign Application Priority Data

Apr. 27, 2020 (CN) .......................... 202010346138.2

(51) Int. Cl.
*B65D 47/20* (2006.01)
*B65D 47/08* (2006.01)
*B65D 47/06* (2006.01)
*B65D 43/02* (2006.01)

(52) U.S. Cl.
CPC ..... *B65D 47/0861* (2013.01); *B65D 43/0225* (2013.01); *B65D 47/063* (2013.01)

(58) Field of Classification Search
CPC .. B65D 47/0861; B65D 47/063; B65D 43/22; B65D 43/26; B65D 43/0225; B65D 43/02; B65D 47/066; B65D 47/0871; F16K 7/08; A47G 19/2266; A47G 19/2272; A47G 19/2288
USPC ...... 222/153.04, 153.14, 507, 528, 545, 548
See application file for complete search history.

(56) References Cited

U.S. PATENT DOCUMENTS

| | | | | |
|---|---|---|---|---|
| 8,464,895 | B2 * | 6/2013 | Gilbert | A47G 19/2272 220/703 |
| 8,602,238 | B2 * | 12/2013 | El-Saden | B65D 51/242 215/389 |
| 8,622,229 | B2 * | 1/2014 | Lane | B65D 43/26 215/305 |
| 9,211,040 | B2 * | 12/2015 | Lane | B65D 43/22 |
| 9,282,838 | B2 * | 3/2016 | Sims | B65D 55/02 |
| 9,380,898 | B2 * | 7/2016 | Mason | A47G 19/2272 |
| 9,462,904 | B2 * | 10/2016 | Coon | B65D 43/265 |
| D865,457 | S * | 11/2019 | Kotani | D7/608 |
| 10,717,566 | B1 * | 7/2020 | Williams | B65D 47/0866 |

(Continued)

*Primary Examiner* — Charles P. Cheyney
(74) *Attorney, Agent, or Firm* — WPAT, PC (57) ABSTRACT

The present invention discloses a lid cover having a locking mechanism and a container assembly comprising the lid cover. The lid cover includes a cap connectable with a connector body having a button constructed to be movable between a first position where the button engages the cap to close the connector body, and a second position where the button is separated from the cap to open up the cap. The locking mechanism includes a knob operably coupled to the button, and capable of moving between a locked position where the knob restrains the button within the first position, and an unlocked position where the knob allows the button to be released from the first position into the second position. The present invention is capable of locking the lid cover to prevent an unexpected opening of the lid cover.

19 Claims, 10 Drawing Sheets

(56) References Cited

U.S. PATENT DOCUMENTS

| | | | |
|---|---|---|---|
| 2002/0036207 A1* | 3/2002 | Ohuo | B65D 47/0885 |
| | | | 220/830 |
| 2014/0197170 A1* | 7/2014 | Carlile | B65D 47/249 |
| | | | 220/262 |
| 2017/0313479 A1* | 11/2017 | Li | B65D 43/22 |
| 2017/0320640 A1* | 11/2017 | Steinmann | B65D 43/16 |

* cited by examiner

LID COVER HAVING A LOCKING MECHANISM AND CONTAINER ASSEMBLY INCLUDING THE LID COVER

FIELD OF THE INVENTION

The present invention relates to the field of lid covers useful in containers, and specifically to a lid cover useful in a container assembly that utilizes a locking mechanism for controlling opening and closing movements of the lid cover. The present invention further relates to containers having the lid cover.

BACKGROUND OF THE INVENTION

A lid cover is an object that prevents water from spilling out of a container and keeps the water in its original state and is placed over the upper end of the container.

Conventionally, the way to open the lid cover is to rotate or button pop. However, if the above opening method is not equipped with any locking and protection mechanisms, then accidents can result from accidental openings, especially among children, thereby allowing water to spill out easily.

There are examples showing conventional ways of locking and protecting mechanism, such as a cup lid disclosed in a Chinese utility model with a patent number of CN201821708581.4. In this particular example, the cup lid includes a button, which has a button channel. A knob is mounted inside the button, and the button on the upper part of the knob is mounted with a positioning rod limit stopper and a hook stopper. When a positioning rod is positioned between a position rod slider and the positioning rod limit stopper, the button cannot be pressed. When the positioning rod crosses the positioning rod slider, and abuts against the positioning rod limit stopper, the pressing of the button will cause a separation of the hook stopper from a hook, thereby causing an upper cover to pop up.

Another cup lid is disclosed in the Chinese utility model with the patent number of CN201520431657.3. In this further example, the base of the cup lid is provided with a water sealing seat, which is connected to the base of the cup lid through a pin that has a torsion spring installed thereon. Additionally, the water sealing seat uses a seal to close the water outlet. A movable button is installed on the base of the cup lid, and such button is provided with an air inlet seal and a button spring. The front end of the button can push the water sealing seat to rotate around the pin and open the spout. To open the water outlet, there is a push piece in the base of the cup lid, which can push the locking pin into a slot at the button for positioning the button. The locking pin can be forced by the locking pin spring to exit the slot in the button. The push piece has an inclined surface to match the locking pin spring. The technical solution in this further example allows the push piece to lock or release the key when the key is released.

In view of the foregoing, the conventional locking and protection mechanisms used in the cup lid have the disadvantages of having too many parts and a complicated structure.

Also, the latch and the handle are conventionally manufactured in one piece, so a large space is required when designing the latch, and any compact design of the lid cover is therefore not realized.

Therefore, the present invention proposes a new locking and protection mechanism for lid covers with fewer parts and a more compact design as compared to the conventional lid covers with locking and protection mechanisms.

SUMMARY OF THE INVENTION

It is an object of the present invention to provide a lid cover having a locking mechanism capable of locking the lid cover to prevent any unexpected opening of the lid cover. Specifically, the latch and the cap are molded separately to achieve a slim and compact design of the lid cover.

It is a further object of the present invention to provide a container with the lid cover.

In order to achieve the foregoing, the present invention provides a lid cover having a locking mechanism comprising a cap and a connector body that are linked. The connector body has a button, which is constructed to be movable between first and second positions. In the first position, the button is engaged with the cap to close the connector body. In the second position, the button is separated from the cap to open up the cap.

The locking mechanism has a knob, which is operably connected to the button and capable of being moved between a locked position and an unlocked position. Specifically, in the locked position, the knob constrains the button to the first position, and in the unlocked position, allows the button to be released from the first position such that the button can be moved to the second position.

In a preferred embodiment, the button moves laterally relative to the longitudinal axis of the lid cover. The knob is rotatably mounted on, and preferably set around the button, so as to encase the button, thereby allowing the button to rotate between the locked and unlocked positions.

Further, the button has a button protrusion and the knob has a knob protrusion. In the locked position, the button protrusion rests against the knob protrusion in the direction of the button's movement as to prevent the button from moving. In the unlocked position, the button protrusion is separated from the knob protrusion, thereby allowing the button to move in the direction of the button's movement. Advantageously, the button protrusion has a convex arc surface on the outer surface toward the knob protrusion, and the knob protrusion has a concave arc surface on the outer surface toward the button protrusion. When the knob is in the locked position, the convex arc surface abuts and engages with the concave arc surface to restrain the button in the first position.

In a specific embodiment, the button is provided with a fan-shaped slot, the angular distance of the fan-shaped slot corresponding to the angular distance between the locked and unlocked positions of the knob. The knob is provided with a stopper rotatable within the fan-shaped slot so as to limit the movement of the knob between the locked and unlocked positions. Preferably, the tops of the two opposite side walls of the fan-shaped slot are provided with chamfers, and at least a portion of the surface of the stopper in contact with the sector slot is chamfered. The chamfers of the stopper correspond to the chamfers of the fan-shaped slot, and through the cooperation of the two, the stopper is allowed to be respectively pressed against the two side walls of the fan-shaped slot when the knob is in either the locked or unlocked position.

In a preferred embodiment, the button further includes a protruding portion extending into the connector body, and the connector body further includes a button pin, which is opposed to the button and engaged with the protruding portion to limit the range of motion of the button. Further still, a pair of pin posts are provided on the button pin, and both sides of the protruding portion are provided with button recesses that can be engaged with the corresponding pin posts to prevent the button from being separated from the connector body.

In another specific embodiment, the protruding portion is provided with a hook, and the cap includes a latch. The latch engages with the hook to connect the cap and the connector body together. Advantageously, the outer surfaces of the latch and the hook are beveled to achieve relative sliding of the latch and the hook.

Preferably, first and second positioning grooves are provided along the circumference of the knob and spaced apart. These two positioning grooves extend in the thickness direction of the knob, and have an angular distance corresponding to the angular distance between the locked and unlocked positions of the knob. Additionally, the button is provided with a positioning block, which is alternately received in the two positioning grooves when the knob is in the locked or unlocked position, for limiting and positioning the rotational movement of the knob.

In another preferred embodiment, the button is provided with a button elastic element made of an elastic material, preferably silicone. The elastic element is configured to continuously apply an outward force to the button.

According to the preferred embodiment of the present invention, the connector body further includes a spout unit, which has a spout and a passage in fluid communication with the spout. The spout unit is mounted such that at least a portion of the spout protrudes beyond the connector body, and the passage being provided within the connector body. When the cap closes the connector body, the cap may act on the spout unit, thereby causing the passage of the spout unit to bend and block the passage. When the cap is opened, the action of the cap on the spout unit is released, thereby allowing the bent passage to unfold, and restoring the passage for a fluid communication with the spout.

Preferably, the connector body further includes a fixing member, which has an open top and an open bottom; and the passage of the spout unit is fixed to a lower part of the fixing member.

Further, the bottom of the spout unit is sleeved with a ring, wherein the outer surface of the annular member and the inner surface of the hollow space of the connector body form a convex portion and a concave portion, respectively, that cooperate with each other to guide the spout unit during up and down movements. The spout unit is made of an elastic material, with an elasticity that permits the unfolding of the bent passage when the action on the spout unit is released.

Preferably, the cap and the connector body are rotatably connected, and a stop is provided at the position of the rotation axis to limit the rotation angle of the cap.

The present invention also provides a container assembly that includes a container having an open top and a lid cover according to the present invention used to cover the container's open top.

Advantageously, the container assembly further includes a straw that extends into the container, and detachably and fluidly communicates with the passage of the spout unit.

The lid cover with a locking mechanism as provided by the present invention has the following beneficial effects.

1. The knob of the present invention can be locked or unlocked by rotating the button used to open the lid cover, which can also be locked to prevent the unintended opening thereof. The knob is provided with a handle so that the user can rotate the knob with one hand, allowing a simple and convenient operation.

2. The latch and the cap of the present invention are molded separately. As compared with the integrated molding, the separately molded latch can be designed with a finer structure to achieve a slim or compact style for the lid cover.

3. All parts in the lid cover of the present invention can be disassembled for easy cleaning.

The description to the reference numbers in the figures is as follows: 1. Container; 2. Lid cover; 3. Seal; 4. Fixing member; 5. Straw; 6. Spout unit; 61. Spout; 611. Spout piece; 612. Lower part of spout; 613. Bottom flange; 62. Passage; 621. Tube; 622. Bottom portion of passage; 63. Annular member; 64. Concave portion; 65. Convex portion; 7. Cap; 8. Connector body; 9. Pin; 10. Button; 11. Knob; 12. Latch; 13. Hook; 14. Fan-shaped slot; 15. Stopper; 16-1. First positioning groove; 16-2. Second positioning groove; 17. Positioning block; 18. Button pin; 19. Button elastic element; 20. Handle; 21. Protruding portion; 22. Knob protrusion; 23. Button protrusion; 24. End recess; 25. Pin post; and 26. L-shaped recessed portion.

DETAILED DESCRIPTION OF PREFERRED EMBODIMENTS

In order to enable those skilled in the art to better understand the present invention, the following is a further detailed description of the invention in conjunction with specific embodiments and the accompanying drawings.

Referring now to the accompanying drawings, FIGS. 1 to 12 illustrate a lid cover according to a preferred embodiment of the present invention as well as a container having the lid cover placed thereon. The container assembly includes a container 1 having an open top and a lid cover 2 used to cover the open top of the container 1 (see FIG. 1) 1. The lid cover 2 can be connected to the open top of the container 1 through a threaded connection, with a seal between the container 1 and the lid cover 2 that prevents liquid from flowing out. The container 1 is used to hold or store contents such as a liquid, and may be of any known type in the art. The interior of the container 1 can be provided with an inner liner made of materials such as ceramic or stainless steel, and a vacuum insulation layer is formed between the inner liner and the container 1 to retard the heat dissipation of the liquid inside and serve the purpose of heat preservation.

Figure 2:
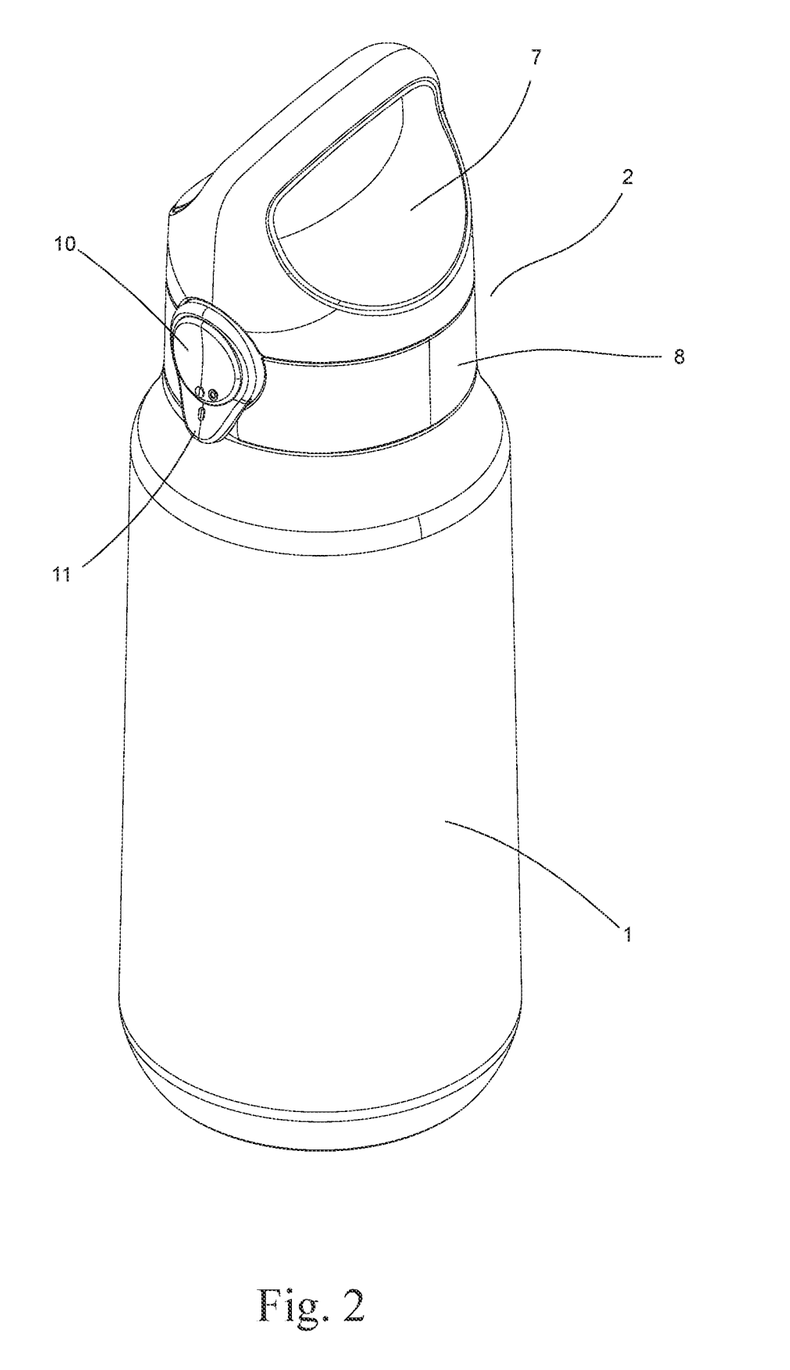
FIG. 2 is a perspective view of the container assembly shown in FIG. 1 in the assembled state.
Figure 3:
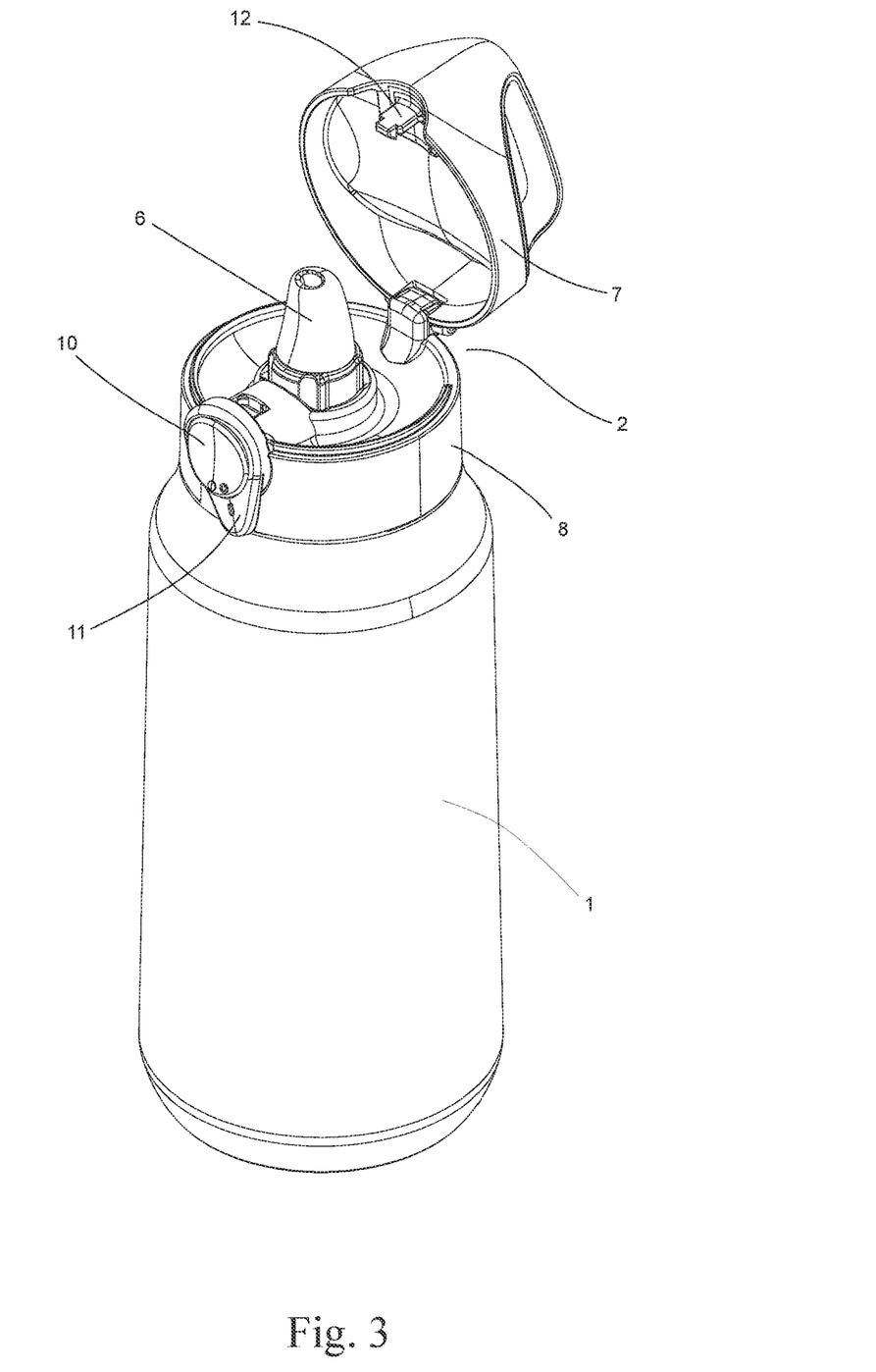
FIG. 3 is a perspective view of the container assembly shown in FIG. 2, with a cap of the lid cover in an open state.

The lid cover 2 includes a cap 7 and a connector body 8. The cap 7 is an openable lid body and the connector body 8 is connected with the container 1 by means of, for example, a screw thread. Preferably, the cap 7 and the connector body 8 are pivotably connected to each other, and more preferably, by means of a pin 9, so that the cap 7 can be opened pivotably around the pin 9 (as shown in FIGS. 2 and 3). The pin 9 is located at the edge between the cap 7 and the connector body 8, and a stop member may also be provided at the position of the pin 9 to limit the pivot angle of the cap 7. Additionally, a hollow space is provided between the cap 7 and the connector body 8 for receiving a spout unit 6.

Figure 1:
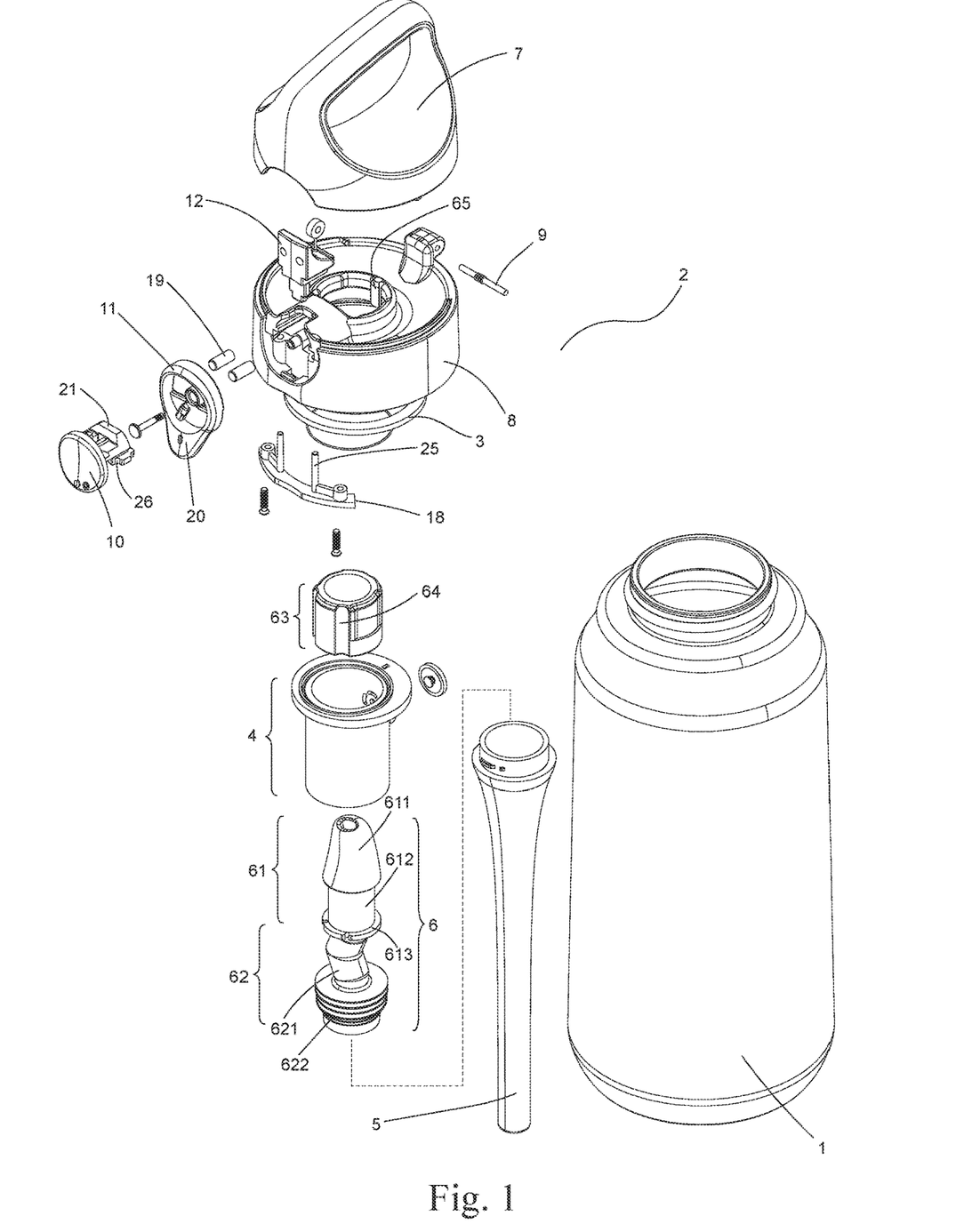
FIG. 1 is an exploded perspective view of a container assembly comprising a lid cover having a locking mechanism according to the present invention.

Specifically, in the hollow space, the connector body 8 may provide a drinking spout which prevents the liquid in the container from flowing out when it is tilted. To this end, the lid cover as illustrated in FIG. 1 of the present invention is configured in such a way that the connector body 8 of the lid cover 2 may include a spout unit 6 comprising a spout 61 and a passage 62 in fluid communication with the spout 61, thereby allowing liquid in the container 1 to flow out through the spout 61. The spout unit 6 is installed in the hollow space of the connector body 8, and at least a part of the spout 61 of the spout unit 6 extends beyond the connector body 8, and is located in the hollow space between the cap 7 and the connector body 8, as shown in FIG. 3. A convex portion 65 is provided on the inner surface of the upper part of the hollow space, and the convex portion 65 cooperates with a concave portion 64 on the outer surface of the annular member 63 to guide the spout 61 to move up and down in the space, as will be described in detail below.

In this embodiment, the spout unit 6 is made of an elastic material similar to silicone, and provided in a single piece. The spout 61 includes a spout piece 611 and a lower part 612 which extends downward from the spout piece and has a bottom flange 613. The passage 62 includes a tube 621 and a bottom portion 622 that extends downward from the tube. The outer side of the bottom portion 622 has a plurality of threads. The annular member 63 is fitted to the lower part 612 of the spout 61, and rests on the bottom flange 613. It is understood that the annular member 63 can be formed integrally with the spout 61, or the two can be formed separately and then joined together. The outer surface of the annular member 63 is formed with a concave portion 64, which is engageable with a convex portion 65 on the inner surface of the hollow space of the connector body 8. The interplay between the convex portion 65 and the concave portion 64 enables the annular member 63 to move in the direction of the longitudinal axis of the lid cover 2, and thus guiding the spout 61 up and down in the hollow space when the cap 7 acts on or releases the spout unit 6.

The passage 62 of the spout unit 6 is set in the connector body 8, which includes a fixing member 4 that has an open top and an open bottom. The passage 62 of the spout unit 6 is screwed onto a lower section of the fixing member 4 by means of threads at the bottom portion 622. Thus, when the cap 7 acts on the spout unit 6, the lower end of the passage 62 of the spout unit 6 remains immobile and the spout 61 is guided to move downward in the hollow space as well as in the fixing member 4, thus causing the tube 621 to bend.

Specifically, when the cap 7 is in the locked position over the connector body 8 to close the container 1, the cap 7 acts on the spout unit 6, i.e., the spout unit 6 is squeezed downward and the upper part of the spout unit 6 moves down and bends the passage 62 of the spout unit 6 to block the passage 62, and thus the liquid content in the container does not flow out. When the cap 7 is switched to the unlocked position and opened, the action of the cap 7 on the spout unit 6 disappears, i.e. the downward force exerted on the spout unit 6 is released, and since the passage 62 of the spout unit 6 is made of a resilient material and is in a bent state, the resilience of the material will cause the spout unit 6 to move upwards, lifting the cap 7. As such, the passage 62 of the spout unit 6 unfolds and returns to a normal state, thereby restoring the passage 62 to a fluid communication with the spout 61.

In this embodiment, the container assembly further includes a straw 5 extending into the interior of the container 1. Specifically, the straw 5 is threaded to and fluidly communicates with the passage 62 of the spout unit 6.

The connector body 8 of the lid cover 2 further includes a button 10 and a knob 11, with the button 10 and the knob 11 being disposed on the side opposite to the pin 9, which is between the cap 7 and the connector body 8. As shown in FIGS. 2 and 3, the button 10 is configured to move laterally within the connector body 8 relative to the longitudinal axis of the lid cover, i.e. move between first and second positions, for linking the cap 7 and the connector body 8 of the lid cover 2. In the first position, the button 10 is engaged with the cap 7 to close the connector body 8. In the second position, the button 10 is separated from the cap 7 to open up the cap 7.

Figure 4:
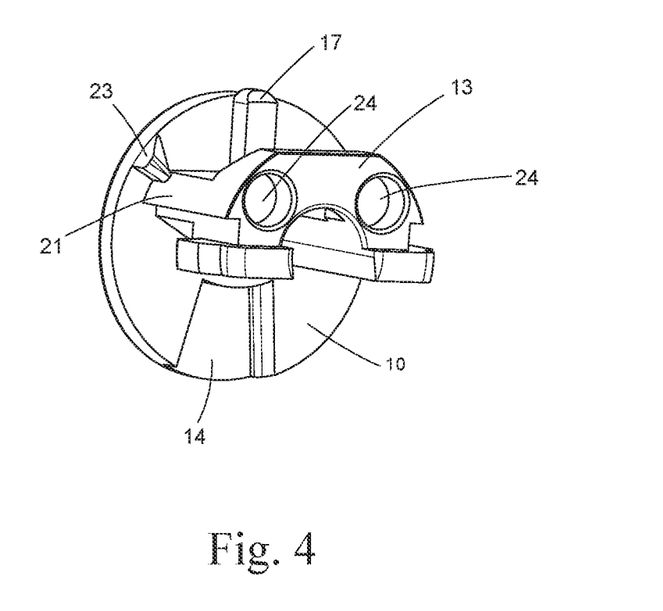
FIG. 4 is a perspective view of a button of the lid cover having the locking mechanism according to the present invention.
Figure 5:
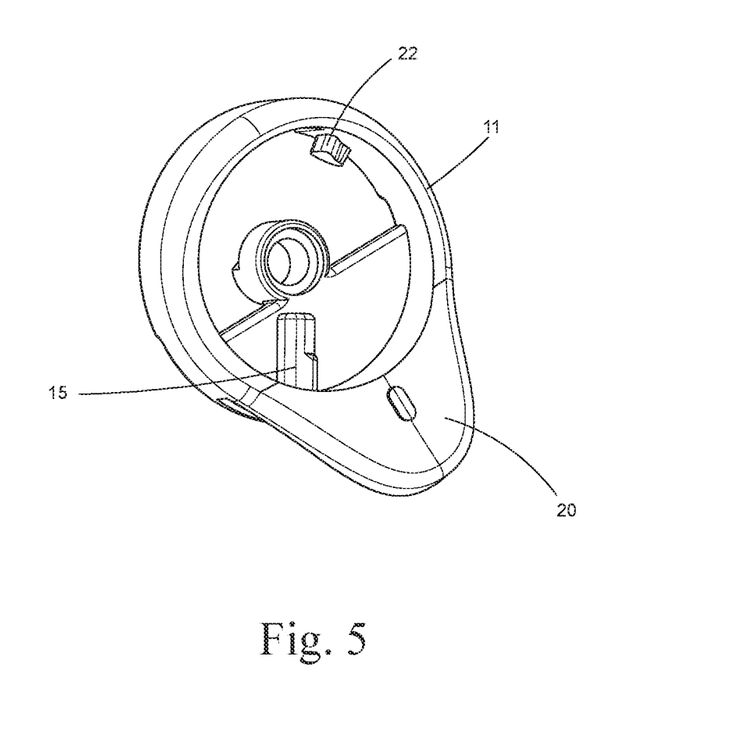
FIG. 5 is a perspective view of a knob of the lid cover having the locking mechanism according to the present invention.

Referring to FIGS. 4 and 5, the shape of the button 10 is preferably circular and the shape of the knob 11 is preferably annular. The knob 11 is configured to be set around the button 10, and located between the button 10 and the body of the connector body 8 to lock the push-in movement of the button 10 toward the interior of the connector body 8, thus preventing the cap 7 from being accidentally opened by the button 10. The knob 11 is rotatably fixed to the connector body 8 by a threaded cylindrical pin and rotates around the button 10 between the locked position and the unlocked position, and when the knob 11 is in the locked position, the button 10 is constrained in the first position, i.e. the button 10 is prevented from moving towards the interior of the connector body 8, and therefore the cap 7 cannot be opened. When the knob 11 is in the unlocked position, the knob 11 allows the button 10 to be released from the first position, enabling the button 10 to be moved to the second position, i.e. the button 10 can be pressed towards the connector body 8, thereby allowing the cap 7 to be opened.

In this implementation, the button 10 is provided with a button protrusion 23 for locking, and the knob 11 is provided with a knob protrusion 22 for locking also. The button protrusion 23 match the knob projection 22 in terms of shape and position, thereby enabling the knob 11 to lock the push of the button 10.

Figure 11:
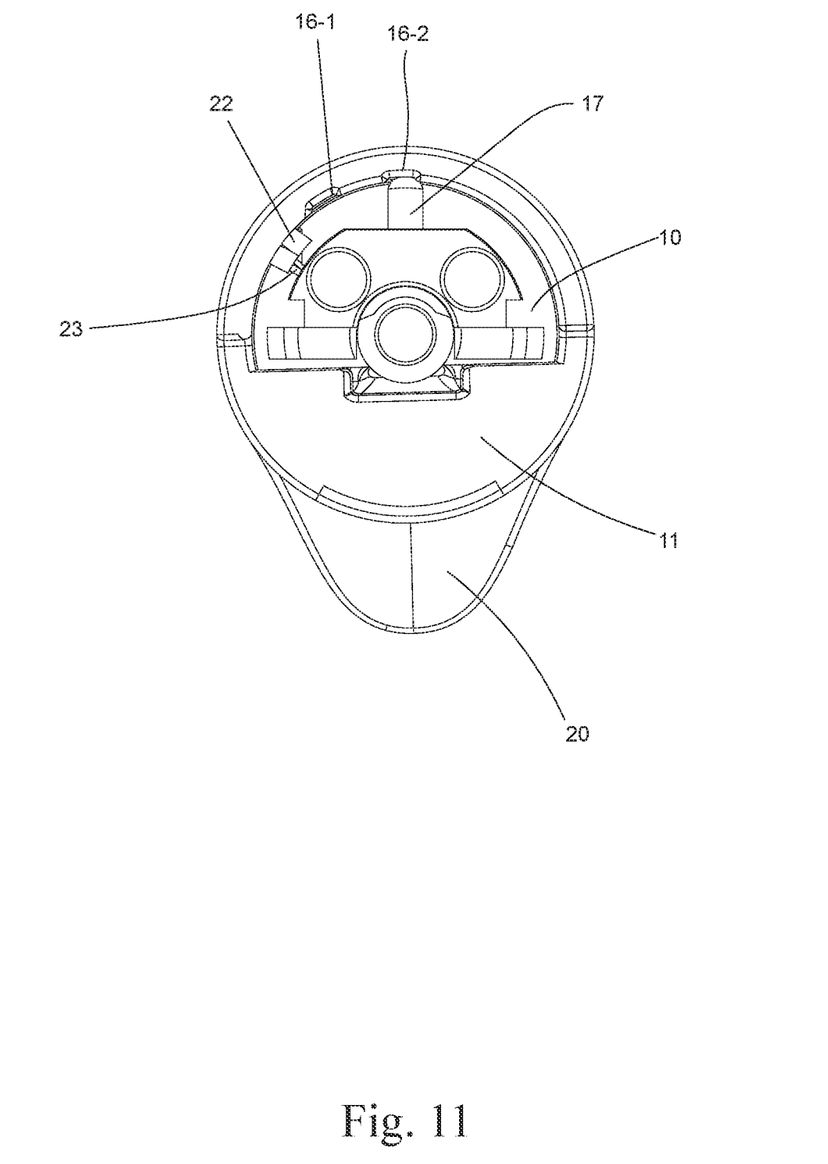
FIG. 11 is a schematic view of the lid cover of the present invention having a locking mechanism in the locked position as viewed from the direction of the knob.
Figure 12:
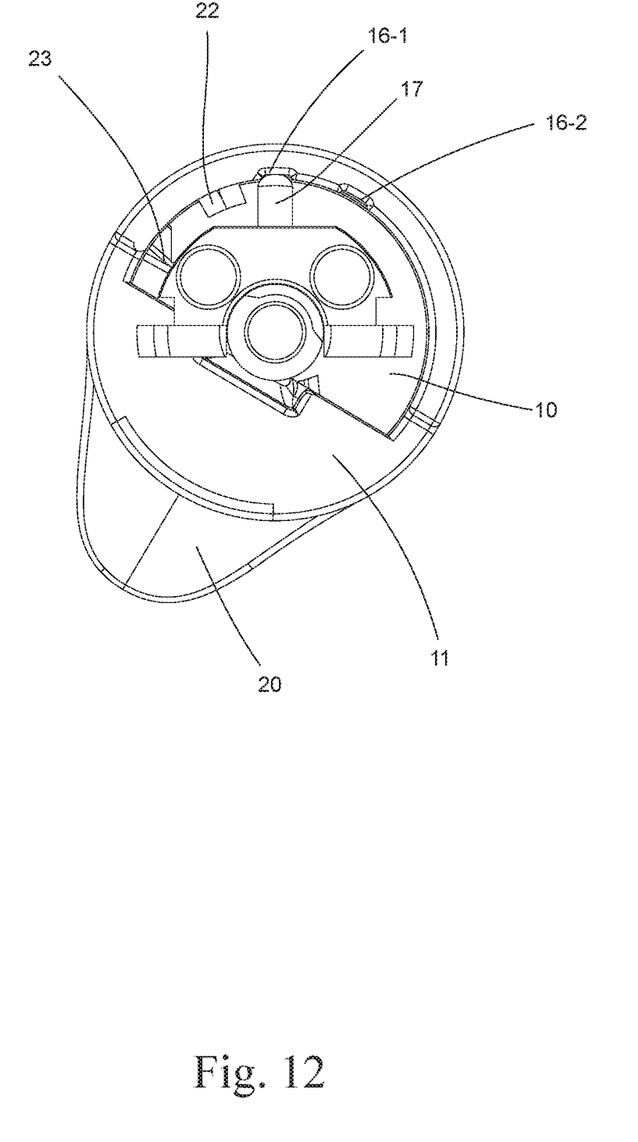
FIG. 12 is a schematic view of the lid cover of the present invention having a locking mechanism in the unlocked position as viewed from the knob direction.

Specifically, the button protrusion 23 has a convex arc surface (as shown in FIG. 4) and the knob protrusion 22 has a concave arc surface (as shown in FIG. 5), the shapes of the two arc surfaces correspond to each other. In the locked position, the button protrusion 23 is in contact with the knob protrusion 22, and the convex arc surface of the button protrusion 23 abuts and engages the concave arc surface of the knob protrusion 22, so that the knob protrusion 22 is located in the movement path of the button protrusion 23, and that the knob 11 is clamped on the outer surface of the connector body 8 and cannot move toward the interior of the connector body 8, thereby preventing the button 10 from being pressed inwards and locking the button 10 (as shown in FIG. 11). In the unlocked position, the button protrusion 23 is separated from the knob protrusion 22, and the button protrusion 23 is no longer resting against the knob protrusion 22, and the knob 11 cannot impede the push of the button 10, so that the button 10 is no longer constrained by the knob 11 in its direction of movement, and is free to move toward or away from the interior of the connector body 8. In this case, the button protrusion 23 is separated from the knob protrusion 22, forming a gap between the button protrusion 23 and the outer surface of the connector body 8. The button protrusion 23 can move toward the interior of the connector body 8 in the gap, thus enabling the button 10 to be pressed to open the cap 7 (as shown in FIG. 12).

Advantageously, first and second positioning grooves 16-1 and 16-2 in spaced apart fashion are provided on the circumference of the knob 11, and extend along the thickness direction of the knob 11. The first and second positioning grooves 16-1 and 16-2 respectively correspond to the two limit positions of the knob rotation range. In other words, the angular distance between the first and second positioning grooves 16-1 and 16-2 (i.e., the sector angle relative to the center of the knob 11) corresponds to the angular distance between the locked and unlocked positions of the knob 11 (i.e., the rotation angle of the knob 11). The button 10 is correspondingly provided with a positioning block 17, which is to be located in the first positioning groove 16-1 of the knob 11 in the unlocked position and in the second positioning groove 16-2 of the knob 11 in the locked position, thereby serving to limit and position the rotational movement of the knob 11.

Figure 10:
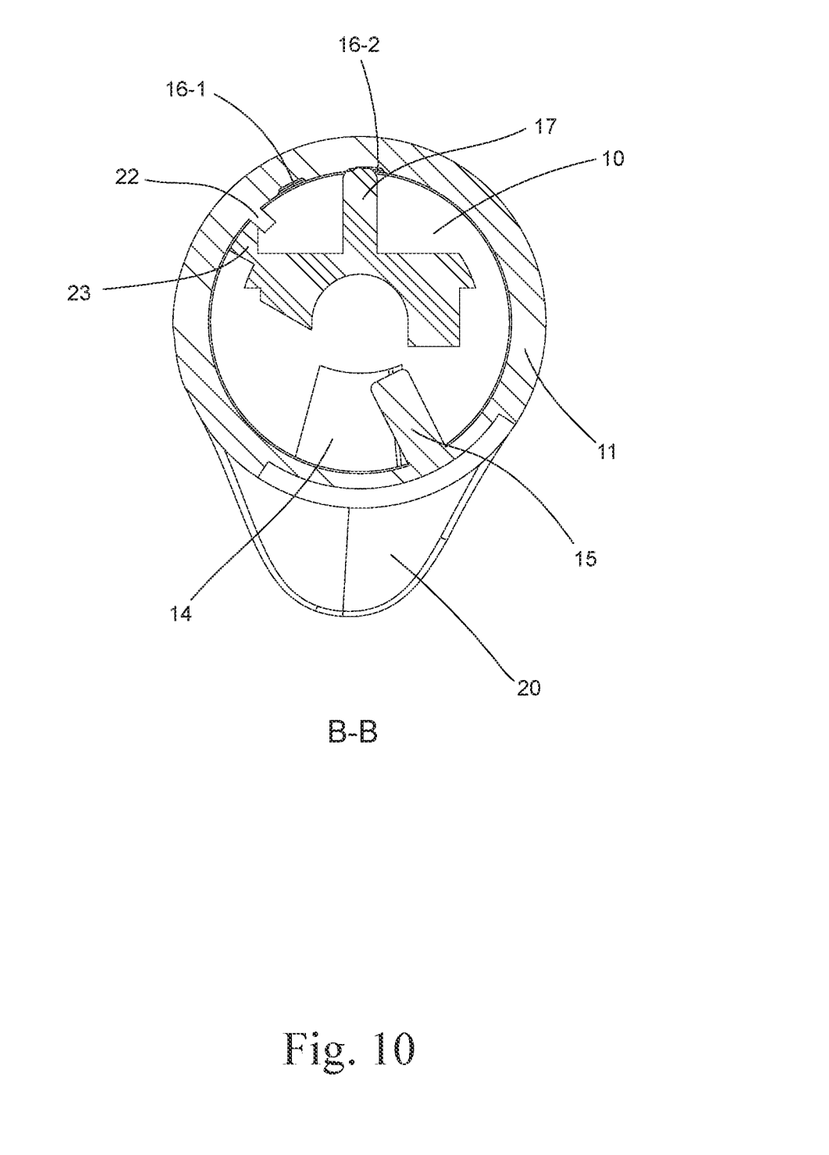
FIG. 10 is a cross-sectional view taken along line B-B in FIG. 9.

The inner surface of the button 10 is provided with a fan-shaped slot 14, and the knob 11 is provided with an elongated stopper 15 slidable into the fan-shaped slot 14. Specifically, the stopper 15 can slide within the range as defined by the two opposite side walls of the fan-shaped slot 14 for limiting the rotation angle of the knob 11. The angular distance of the fan-shaped slot 14 (i.e., the sector angle as defined by the two side walls of the fan-shaped slot 14) corresponds to the angular distance between the locked and unlocked positions of the knob 11 (i.e., the rotational angle of the knob 11). The two opposite side walls of the fan-shaped slot 14 are respectively provided with chamfers, preferably on the top of the side walls. At least a portion of the surface of the stopper 15 in contact with the fan-shaped slot 14 is also provided with a chamfer, and the chamfers on the side walls of the fan-shaped slot 14 correspond respectively to the chamfer of the stopper 15. These chamfers mutually cooperate such that in the locked position, the stopper 15 is positioned on the edge of the fan-shaped slot 14 (i.e., the side wall) at an angle to that edge, which can prevent further rotation of the knob 11 (as shown in FIG. 10); and in the unlocked position, the stopper 15 is located within the fan-shaped slot 14 to allow the button 10 to be pressed. By matching the chamfer of the stopper 15 with the chamfers of the edge of the fan-shaped slot 14, the stopper 15 can be pressed against the side wall of the fan-shaped slot 14 in the locked position or in the unlocked position, thus preventing the knob from being automatic opened.

Figure 6:
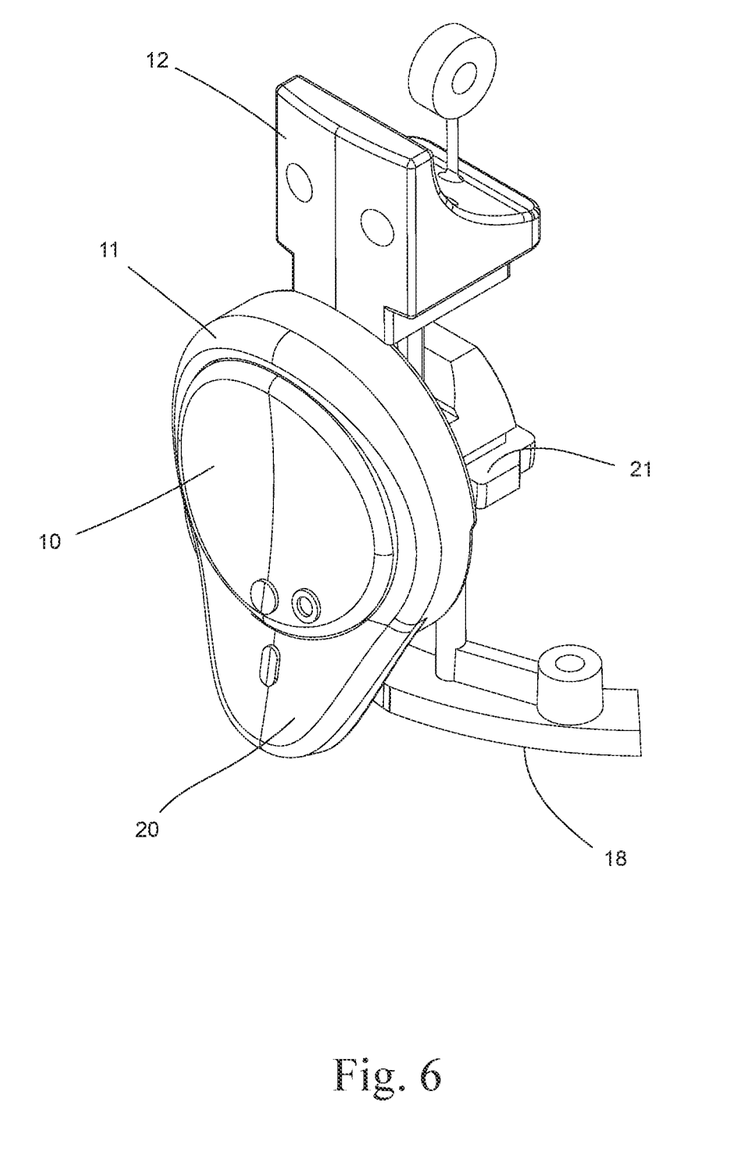
FIG. 6 is a perspective view of the lid cover having the locking mechanism that includes the button and the knob assembled with a latch according to the present invention.
Figure 7:
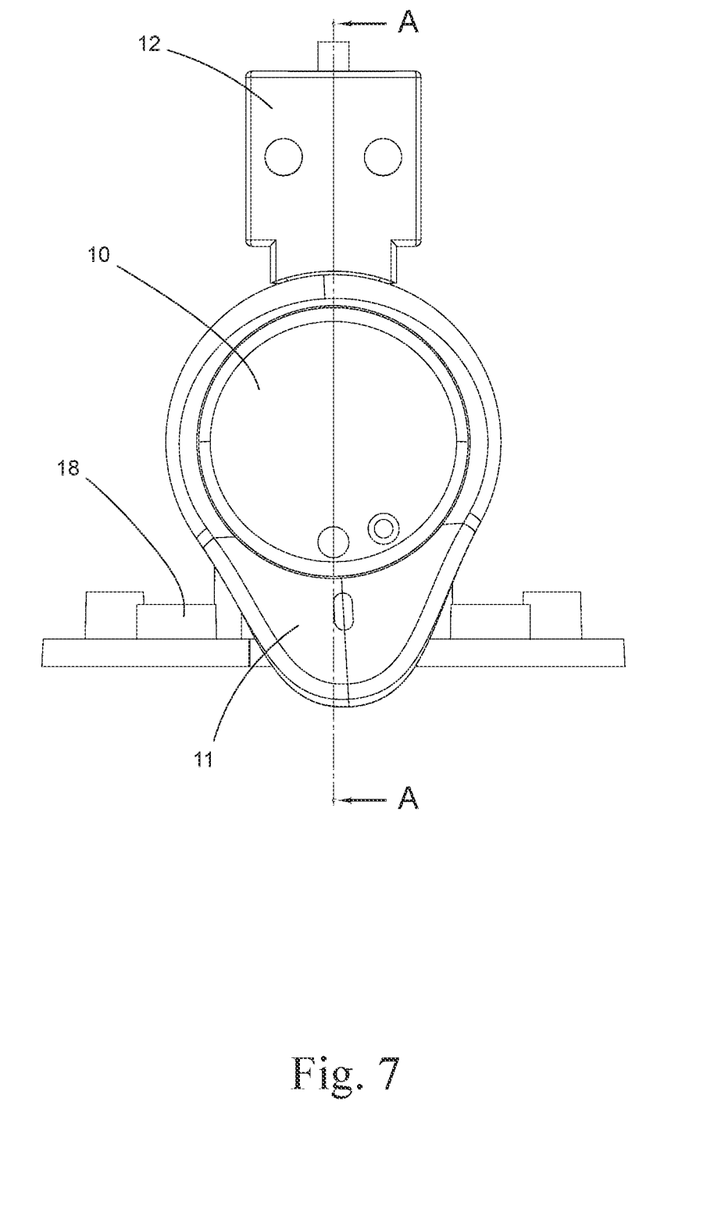
FIG. 7 is a front view of FIG. 6.

The knob 11 is provided with a handle 20 for an easy one-handed operation by the user to rotate the knob. The handle 20 may be a tongue-shaped structure protruding from the knob 11 (as shown in FIG. 5), or other possible protruding structures. An indication mark is applied on the handle 20, and a status mark is applied on the button 10 to indicate a locked state and an unlocked state, respectively. When the knob 11 is rotated, the indication mark can point to a different status mark to inform the user of the state in which the knob 11 is located. A form of the status mark and the indication mark is shown in FIG. 6.

The button 10 includes a protruding portion 21 extending from its inner side surface towards and into the connector body 8. Two cylindrical button elastic elements 19 made of silicone are provided between the protruding portion 21 and the connector body 8. The button elastic elements 19 each have one end accommodated in the end recess 24 of the protruding portion 21 (see FIG. 4), and the other end pressed against the connector body 8. The button resilient elements 19 are configured to continuously apply an outward force to the button 10 when pressed, so that after pressing in the button 10, the button elastic elements 19 will force the button 10 to move outward. The button elastic element 19 may be of a spring or other components made from resilient materials.

To prevent the button 10 from moving outwardly away from the connector body 8, a button pin 18, which is fixed to the connector body 8, is provided by aid of a screw passing through the bottom of the button 10. The button pin 18 is matched to the protruding portion 21 for limiting the range of movement of the button 10. Specifically, the button pin 18 has a pair of pin posts 25, so that when the button 10 is in the first position to engage the cap 7 (i.e., the cap 7 closes the connector body 8), the pin posts 25 abut against the L-shaped recessed portions 26 on the bottom sides of the protruding portion 21, thus preventing the button 10 from continuing to move outward after the abutment by the two pin posts 25. When the button elastic elements 19 cause the button 10 to move outwardly away from the connector body 8, the button pin 18 prevents the button 10 from moving away from the connector body 8, thus acting as a restraint to the movement of the knob 11.

Figure 8:
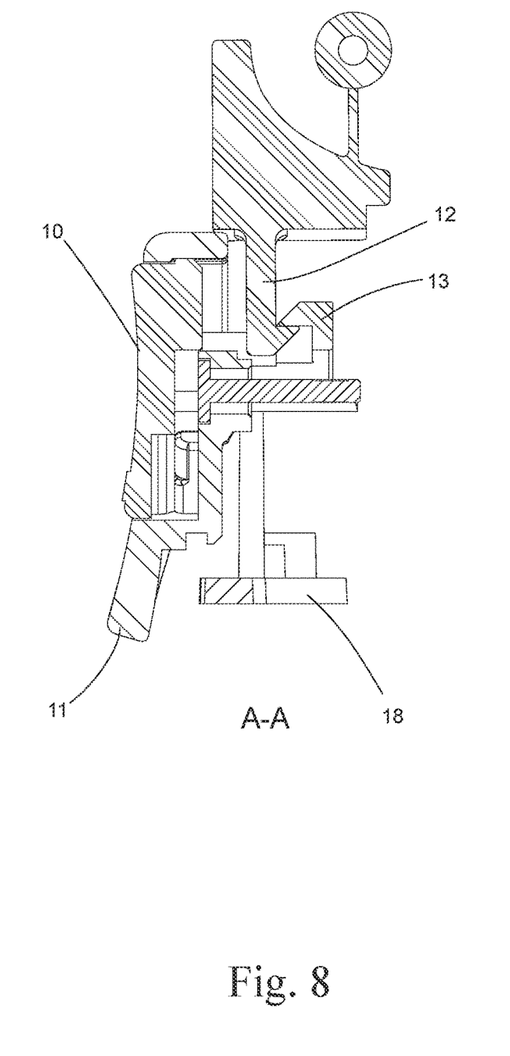
FIG. 8 is a cross-sectional view taken along line A-A in FIG. 7.
Figure 9:
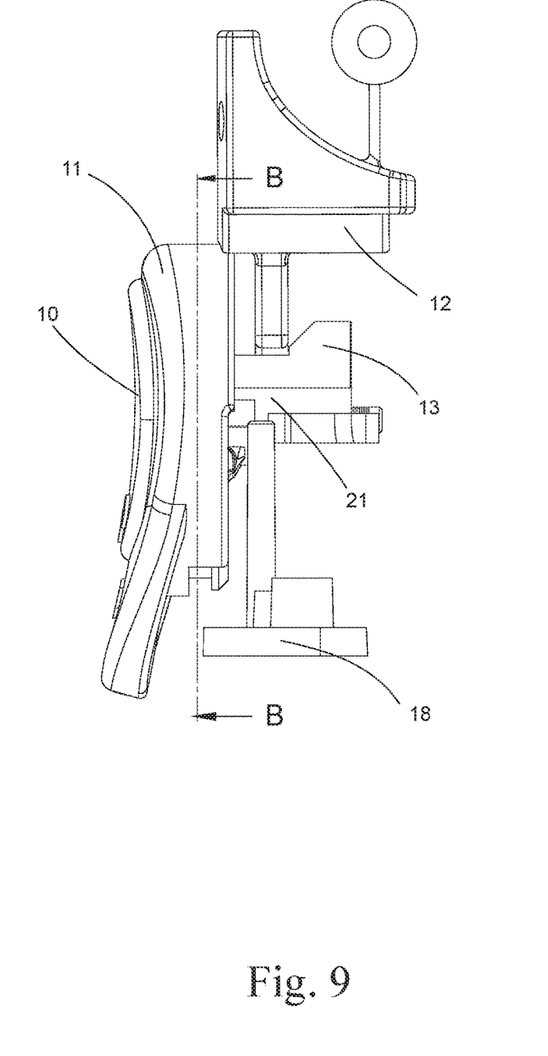
FIG. 9 is a side view of FIG. 6.

A hook 13 is provided on the protruding portion 21 of the button 10, and the cap 7 includes a latch 12. The hook 13 is capable of engaging the latch 12 for connecting the cap 7 to the connector body 8 (as shown in FIG. 8). In the locked state, the latch 12 is locked to the hook 13, thus preventing the cap 7 from being separated from the connector body 8. In the unlocked state, by pressing the button 10, the hook 13 is moved to the inside of the connector body 8, and disengaged from the hook 13, i.e., the cap 7 is separated from the connector body 8 to be become the unlocked state. The outer surfaces of the hook 13 and the latch 12 are inclined, and when the latch 12 is pressed down during the unlocked state, the relative sliding of the latch 12 and the hook 13 can be realized by the inclined surfaces to lock the hook 13 on the latch 12.

In this implementation, the latch 12 and the cap 7 are separately manufactured components rather than integrally formed or one-piece molded component. Therefore, the space used to design the latch 12 in this implementation can be very small as compared to the integrated molding method used conventionally, and a slim and compact design of the lid cover can be achieved.

All parts of the lid cover according to the present invention are detachable, which allows for an easy cleaning and easy operation by the user.

When the lid cover of the present invention is in use, the user can rotate the knob 11 to its unlocking position to unlock the button 10, after which the button 10 can be pressed to disengage the latch 12 from the hook 13, and then the cap 7 can be opened. After use, the user can lock the latch 12 from the hook 13 by pressing the cap 7, and rotating the knob 11 in the opposite direction to its locking position for securing the button 10 and preventing the cap 7 from being opened by mistake.

Specific examples are applied herein to elaborate on the inventive concept, and the above description of embodiments is only used to assist the understanding of the core concept of the present invention. It should be noted that any obvious modifications, equivalent replacements or other improvements made by a person of ordinary skill in the art, without departing from the inventive concept, shall be included in the scope of protection of the present invention.

What is claimed is:

1. A lid cover having a locking mechanism comprising:
   a cap (7);
   a connector body (8) connectable to the cap (7) and having a button (10), the button (10) being constructed to be movable between a first position where the button (10) is engaged with the cap (7) to cover the connector body (8), and a second position where the button (10) is separated from the cap (7) to open up the cap (7);
   wherein the locking mechanism comprises a knob (11) operably connected to the button (10), and capable of being moved between a locked position where the knob (11) restrains the button (10) in the first position, and an unlocked position where the knob (11) allows the button (10) to be released from the first position causing the button (10) to move into the second position; and
   wherein the button (10) moves laterally with respect to a longitudinal axis of the lid cover, and the knob (11) is rotatably mounted and sleeved around the button (10); the knob is capable of rotating around the button (10) between the locked and unlocked positions.

2. The lid cover according to claim 1, wherein the button (10) comprises a button protrusion (23), and the knob (11) comprises a knob protrusion (22), wherein, in the locked position, the button protrusion (23) abuts against the knob protrusion (22) in a direction of moving the button (10), thereby preventing the button (10) from moving, and wherein in the unlocked position, the button protrusion (23) is separated from the knob protrusion (22), thereby allowing the button (10) to move in the direction of movement.

3. The lid cover according to claim 2, wherein an outer surface of the button protrusion (23) facing the knob protrusion (22) has a convex arc surface, and an outer surface of the knob protrusion (22) facing the button protrusion (23) has a concave arc surface so that when the knob (11) is in the locked position, the convex arc surface abuts and engages the concave arc surface to restrain the button (10) in the first position.

4. The lid cover according to claim 1, wherein the button (10) is provided with a fan-shaped slot (14) having an angular distance corresponding to an angular distance defined by the locked and unlocked positions of the knob (11), the knob (11) being provided with a stopper (15) rotatable within the fan-shaped slot (14), thereby limiting the movement of the knob (11) between the locked and unlocked positions.

5. The lid cover according to claim 4, wherein the fan-shaped slot (14) are provided with chamfers in top portions of two opposite side walls thereof, and at least a part of a surface of the stopper (15) in contact with the fan-shaped slot (14) is chamfered so that the chamfer of the stopper (15) corresponds to the chamfers of the fan-shaped slot (14), and wherein by mutual cooperation, the stopper (15) is pressed against the side walls of the fan-shaped slot (14) when the knob (11) is in the locked or unlocked position, respectively.

6. The lid cover according to claim 1, wherein the button (10) further comprises a protruding portion (21) extending into the connector body (8), and the connector body (8) further comprises a button pin (18), which is engageable with the protruding portion (21) to limit the range of movement of the button (10).

7. The lid cover according to claim 6, wherein the button pin (18) has two pin posts, and each side of the protruding portion (21) is provided with a recess that is engageable with the respective pin posts, thereby preventing the button (10) from being detached from the connector body (8).

8. The lid cover according to claim 6, wherein the protruding portion (21) is provided with a hook (13), and the cap (7) comprises a latch (12), which is engageable with the hook (13) to connect the cap (7) and the connector body (8) together.

9. The lid cover according to claim 8, wherein the latch (12) and the hook (13) each have an opposing outer surface that is inclined to allow for relative slidable movement of the latch (12) and the hook (13).

10. The lid cover according to claim 1, wherein along a circumference of the knob (11), a first positioning groove (16-1) and a second positioning groove (16-2) are provided in spaced apart fashion, wherein the first and second positioning grooves (16-1, 16-2) extend in a direction of thickness of the knob (11), and have an angular distance that corresponds to an angular distance defined by the locked and unlocked positions of the knob (11), and wherein the button (10) is provided with a positioning block (17), which is alternately received in the first and second positioning grooves (16-1, 16-2) when the knob (11) is in the locked or unlocked position, for limiting and positioning rotational movement of the knob (11).

11. The lid cover according to claim 1, wherein the button (10) is provided with at least one button elastic element (19) made of an elastic material, and wherein the button elastic element (19) is configured to continuously apply an outward force to the button (10).

12. The lid cover according to claim 1, wherein the connector body (8) further comprises a spout unit (6), which has a spout (61) and a passage (62) in fluid communication with the spout (61), and wherein the spout unit (6) is mounted to have at least a part of the spout (61) protruding beyond the connector body (8), and the passage (62) is arranged within the connector body (8).

13. The lid cover according to claim 12, wherein the cap (7) acts on the spout unit (6) when the cap (7) closes the connector body (8), thus causing the passage (62) of the spout unit (6) to bend and block the passage (62), and wherein when the cap (7) is opened, the action of the cap (7) on the spout unit (6) is released, thus allowing the passage (62) to unfold, restoring the passage (62) to the fluid communication with the spout (61).

14. The lid cover according to claim 13, wherein the connector body (8) further comprises a fixing member (4), which has an open top and an open bottom, and wherein the passage (62) of the spout unit (6) is connected fixedly to a lower part of the fixing member (4).

15. The lid cover according to claim 14, wherein an annular member (63) is sleeved over a lower portion of the spout (61), wherein an outer surface of the annular member (63) and an inner surface of a hollow space of the connector body (8) form mutually cooperating concave and convex portions (64, 65), respectively, for guiding upward and downward movements of the spout (61).

16. The lid cover according to claim 13, wherein the spout unit (6) is made of an elastic material, which has elasticity for allowing the unfolding of the passage (62) when the action on the spout unit (6) is released.

17. The lid cover according to claim 1, wherein the cap (7) and the connector body (8) are pivotally connected, and a stop is provided at a position of the pivot for limiting an angle of pivoting the cap (7).

18. A container assembly comprising:
   a container (1) having an open top; and a lid cover with having a locking mechanism according to claim 1, comprising:
   a cap (7),
   a connector body (8) connectable to the cap (7) and having a button (10), the button (10) being constructed to be movable between a first position where the button (10) is engaged with the cap (7) to cover the connector body (8), and a second position where the button (10) is separated from the cap (7) to open up the cap (7);

wherein the locking mechanism comprises a knob (11) operably connected to the button (10), and capable of being moved between a locked position where the knob (11) restrains the button (10) in the first position, and an unlocked position where the knob (11) allows the button (10) to be released from the first position causing the button (10) to move into the second position;

wherein the button (10) moves laterally with respect to a longitudinal axis of the lid cover, and the knob (11) is rotatably mounted and sleeved around the button (10); the knob capable of rotating around the button (10) between the locked and unlocked positions; and wherein the lid cover is used to cover the open top of the container (1).

19. The container assembly according to claim 18, further comprising a straw (5) extending into the container, and wherein the straw (5) is removably and fluidly communicates with the passage (62) of the spout unit (6).

\* \* \* \* \*